(12) United States Patent
Elliott et al.

(10) Patent No.: US 9,807,627 B2
(45) Date of Patent: Oct. 31, 2017

(54) NETWORK ACCESS RESTORATION

(71) Applicant: BRITISH TELECOMMUNICATIONS PUBLIC LIMITED COMPANY, London (GB)

(72) Inventors: David Mark Elliott, London (GB); Patrick Rowan Limb, London (GB); Richard Gedge, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 5 days.

(21) Appl. No.: 14/648,018

(22) PCT Filed: Nov. 15, 2013

(86) PCT No.: PCT/GB2013/000492
§ 371 (c)(1),
(2) Date: May 28, 2015

(87) PCT Pub. No.: WO2014/083296
PCT Pub. Date: Jun. 5, 2014

(65) Prior Publication Data
US 2015/0319628 A1    Nov. 5, 2015

(30) Foreign Application Priority Data
Nov. 29, 2012    (EP) .................................. 12250175

(51) Int. Cl.
*H04W 24/04* (2009.01)
*H04W 76/02* (2009.01)
(Continued)

(52) U.S. Cl.
CPC ......... *H04W 24/04* (2013.01); *H04W 76/028* (2013.01); *H04W 84/02* (2013.01);
(Continued)

(58) Field of Classification Search
CPC ... H04W 24/04; H04W 76/028; H04W 84/02; H04W 84/12; H04W 88/08; H04W 92/12; H04W 92/20; H04L 45/28
See application file for complete search history.

(56) References Cited

U.S. PATENT DOCUMENTS 6,212,375 B1    4/2001  Alanara
6,999,459 B1 *  2/2006  Callon .................... H04L 45/22
                                                370/216
(Continued)

FOREIGN PATENT DOCUMENTS

EP         2 387 266      11/2011
WO    WO 2011/113467       9/2011

OTHER PUBLICATIONS

International Search Report for copending Application No. PCT/GB2013/000491, dated Jul. 15, 2014, 5 pages.
(Continued)

*Primary Examiner* — Ian N Moore
*Assistant Examiner* — Latresa McCallum
(74) *Attorney, Agent, or Firm* — Nixon & Vanderhye P.C.

(57) ABSTRACT

Access between a data terminal 1 and a data network 5 by way of a first wireless-enabled access point 3 is restored after a primary connection 4 between the first access point and the data network is lost by having the access point 3 scan for a further wireless-enabled access point 6 and establishing a wireless connection between the first access point 3 and the further access point 6 such that the data terminals 1 etc can connect to the data network by way of the access points 3, 6 and the wireless connection between them.

9 Claims, 3 Drawing Sheets

(51) Int. Cl.
  *H04W 84/12* (2009.01)
  *H04W 88/08* (2009.01)
  *H04W 84/02* (2009.01)
  *H04W 92/12* (2009.01)
  *H04W 92/20* (2009.01)

(52) U.S. Cl.
  CPC ............ *H04W 84/12* (2013.01); *H04W 88/08* (2013.01); *H04W 92/12* (2013.01); *H04W 92/20* (2013.01)

(56) References Cited

U.S. PATENT DOCUMENTS

| | | |
|---|---|---|
| 2009/0213730 A1 | 8/2009 | Zeng et al. |
| 2011/0032816 A1* | 2/2011 | Isaksson ............. H04W 76/028 370/225 |
| 2011/0075633 A1* | 3/2011 | Johansson ............. H04W 36/02 370/331 |
| 2011/0280118 A1 | 11/2011 | Maharana et al. |
| 2012/0002537 A1 | 1/2012 | Bao et al. |
| 2012/0224481 A1 | 9/2012 | Babiarz |
| 2012/0225655 A1 | 9/2012 | Son et al. |
| 2013/0182560 A1 | 7/2013 | Hartog |

OTHER PUBLICATIONS

Gandhi "Tolerance to access-point failures in dependable wireless local-area networks", Object-Oriented Real-Time Dependable Systems 2003, Proceedings. Ninth IEEE International Workshop, on Oct. 1-3, 2003, Jan. 1, 2003, pp. 136-143.
International Search Report for PCT/GB2013/000492 dated Feb. 11, 2014, 4 pages.
Office Action dated Mar. 23, 2017 issued in co-pending U.S. Appl. No. 14/648,442 (38 pgs.).

* cited by examiner

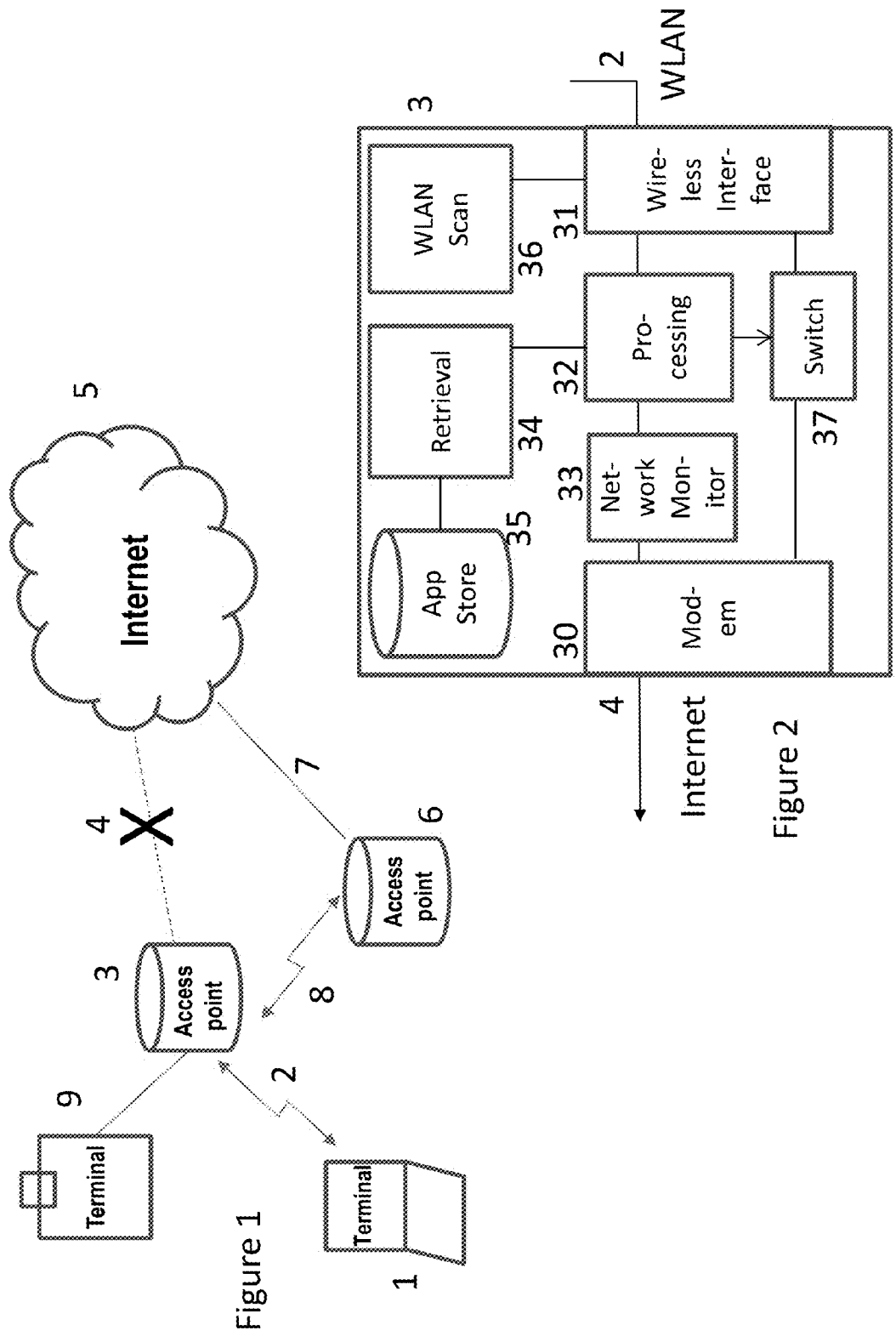

NETWORK ACCESS RESTORATION

This application is the U.S. national phase of International Application No. PCT/GB2013/000492 filed 15 Nov. 2013, which designated the U.S. and claims priority to EP Patent Application No. 12250175.2 filed 29 Nov. 2012, the entire contents of each of which are hereby incorporated by reference.

BACKGROUND AND SUMMARY

This invention relates to connection of data terminals to a data network through wireless access points, and in particular to restoration of such access in the event of failure of a primary connection between an access point and the data network.

Connection to data networks such as the Internet has become an integral part of many domestic and small business activities. Typically, one or more user terminals will connect to the public network through a local area network (LAN) controlled by a router, which mediates data messages between the user terminal and the internet, including providing modem functions. Connection between the terminal and the router may be by an Ethernet or Powerline connection, but increasingly wireless connection is used (a Wireless LAN or WLAN) as this allows terminals to be placed anywhere within wireless range of the router.

Terminals connected to the same router may also communicate between each other without going through the external network. To provide privacy for such activity, and to ensure the router is not misused by unauthorised persons to gain access to the internet, routers typically have access protection to ensure only users with the correct access credentials can use it.

Public wireless access points also exist which allow any users with appropriate terminal equipment to connect to the Internet. These access points may be dedicated public access points provided by commercial enterprises to attract custom, or parts of the capacity of privately-owned access points made available to the public by their owners in exchange for reciprocal access rights to other participants' access points.

Failure of the primary connection between an access point and the network can be problematic as users have become reliant on their internet connections for many business and domestic purposes. In many cases a service provider's helpdesk, or a troubleshooting application, can guide the user to establish a replacement connection to the Internet through a public wireless access point whilst the fault in the primary connection is under repair.

Many troubleshooting operations can be provided by information available on the Internet, but if it is the Internet connection itself which has failed that information is not accessible unless the user has had the foresight to download it in advance. Consequently, such failures account for a very high proportion of calls to network operators' helpdesks— and in even that course of action may not be available if the Internet connection is over the user's telephone line, as the failure is likely to have affected voice calls over the telephone line as well.

The present invention provides a process to allow automatic re-establishment of connection between a user and the data network on detection of failure of the primary network.

It is known, in a related art, to provide for an access point, on detecting a failure of its backhaul (primary) connection, to generate redirection instructions to the wireless terminals currently connected to it. An example of this is described in United States patent application US2011/0032816. However, the system described therein presupposes that the access point has data stored therein relating to the alternative access points to which the terminals should attempt connection. Such an arrangement may be practical in a planned cellular telephone network, where the identities and locations of access points are predetermined by the network operator, and relatively permanent. However, in a network in which access points are under the control of individual users, the availability of such access points is more fluid and unpredictable. Users may move their access points around, or switch them off altogether. In many cases, the access points are provided primarily for the owner's own use, and public access is provided (with suitable firewall protection) only if, and to the extent that, the owner is not using the full capacity. It is therefore not possible, in general, to pre-programme specific redirection instructions in an access point for use in the event of failure of its primary backhaul connection. It is also known, for example from US patent application 2009/0213730, to provide each access point with multiple wireless interfaces, and using one of the multiple interfaces in each of two such access points to relay data between them. However, this arrangement not only requires both the access points to be fitted with multiple wireless interfaces, but also requires any users using one of these interfaces for any other purpose to lose their connection if the interface is to be used for relay purposes. Since each interface can only handle either local traffic or relay traffic, the amount of either traffic that can be handled cannot be allocated flexibly over the whole capacity of the access point.

The present invention provides a system for managing a failure situation (which, it is to be hoped, is a rare event) without any special equipment being required. In particular, the invention only requires special capabilities in the access point experiencing the loss of backhaul connection, such that it may connect to the network through any other access point, whether modified or not.

According to the present invention, there is provided a process for restoration of access between one or more data terminals and a data network by way of a first wireless-enabled access point in communication with the data terminals through a wireless interface after a primary connection between the first access point and the data network is lost, comprising the steps of a) detecting loss of the primary connection to the data network b) conducting a scan for a further wireless-enabled access point c) establishing a wireless connection using the said wireless interface between the first access point and the further access point d) attempting connection between the first access point and the data network by way of the further access point, e) in the event of successful connection to the data network by the first access point, establishing connection between the one or more data terminals and the data network by way of the first and further access points.

The invention also provides a wireless-enabled access point for connecting one or more user terminals to a data network, having a wireless interface to communicate with the user terminals and a second interface arranged to provide a primary connection to the data network, the access point having a connection monitor to detect loss of the primary connection, a scanner to detect the presence of one or more further wireless-enabled access points, and arranged to establish a wireless connection to the data network by way of the said wireless interface and one of the further wireless-enabled access points, and a switching processor for connecting user terminals to the data network by way of the further wireless-enabled access point.

In the preferred arrangement, the access point continues to monitor for availability of the primary connection to identify when connection by way of the primary connection becomes available, and restores its settings to effect such reconnection. The application may be arranged to defer such reconnection until any data session in progress has been completed.

The invention allows a router which loses its internet connection to automatically seek a neighbouring public wireless access point and connect to it in order to maintain an internet connection. In the preferred embodiment a message will be displayed on any user terminal connected to the access point to notify the user that the connection is defaulting to a different access route, as it may affect the available bandwidth. The user may also be advised to report the fault on the primary connection, or advised that the service provider is already aware of the fault.

The invention may be implemented by software installed in the access point, either on manufacture, or by subsequent upgrade of the programming of the access point by installation of software provided on a physical carrier (e.g. a CD-ROM) or by download over the internet connection.

It will be noted that the access point initiating the relay function may do so through any public access point still connected to the backhaul network. There is no requirement for that access point to be modified. It simply detects the initiating access point as if it were a normal user of the public wireless capability. The user will, of course, be handled like any other public user, for example being allocated lower priority than any dedicated users of the public access point.

In the preferred embodiment the access point is configured to suspend advertising its presence whilst the backhaul connection is unavailable. This will prevent further wireless devices attempting to connect to it, and will also prevent "loops" occurring, so that, for example, if two neighbouring access points both lose their respective primary connections they will not each attempt to restore connection through the other.

In a variant, once a first access point has successfully restored connection to the data network by way of a second access point that is itself still connected, the first access point may once again advertise its presence such that a third access point may, in turn, restore connection to the data network by way of the first and second access points, and so on. Each access point in the chain sees the next one upstream as a public user. However, each access point in the series would only have partial access to the capacity of the access point next in the series, so the capacity available to the access point furthest from the data network connection would be significantly less than that of those nearer to the data connection.

BRIEF DESCRIPTION OF THE DRAWINGS

An embodiment of the invention will now be described with reference to the drawings in which:

FIG. 1 illustrates a typical wireless LAN in which the invention may be implemented FIG. 2 illustrates the relevant functional elements of an access point in which the invention may be installed

DETAILED DESCRIPTION OF PRESENT EXAMPLE EMBODIMENTS

Figure 3:
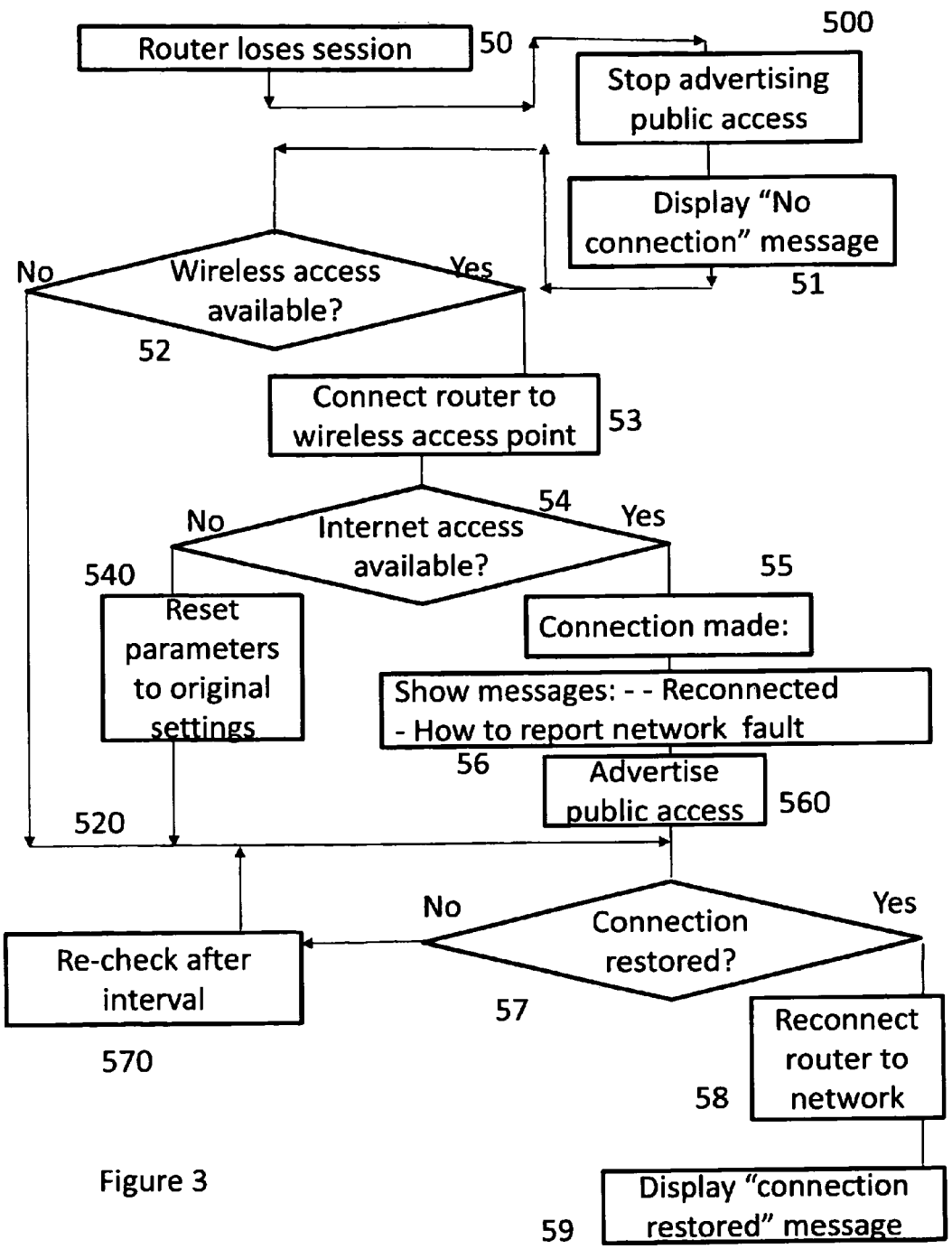
FIG. 3 is a flow diagram illustrating the process according to the invention.

FIG. 1 illustrates a data terminal 1 having a wireless access capability, by which it is connected using a Wireless LAN to a wireless router 3, which is in turn connected over a data connection 4 to a data network 5. The terminal 1 is configured to connect automatically to the router 3, using a private Wireless LAN. A second data terminal 9 is also connected to the router 3.

Also depicted in FIG. 1 is a second, public access point 6 having its own connection 7 to the Internet 5. Conventionally, the terminal 1 would be able to detect the public access point 6 if it is in range, any such access points being identified to the user as being available for connection when first setting up the connection 2, or if the terminal 1 has been taken out of range of the previously selected access point 3.

The present invention provides a process for automatically replacing a failed direct primary connection 4 between the router 3 and the Internet 5 with a substitute connection 7, 8 making use of a nearby wireless router 6. Such initial failure of the link 4 cannot be detected directly by the terminal 1, as the WLAN 2 continues to operate.

Depending on the design and configuration of its switching system 37, the router 3 may be able to operate as a wireless repeater (transmitting and receiving data over the wireless interface 31 to and from different co-operating devices 1, 6) or it may only be capable of operation in client mode only, where terminals connected over a wired LAN can use the backup wireless connection 8.

FIG. 2 shows the relevant functional elements of the router 3 in more detail. The router comprises a modem/network interface 30 for connection to the internet 5 over a link 4, and a radio interface 31 for providing the wireless interface to one or more data terminals over the WLAN 2. A switching function 37 directs communication between the various inputs and outputs to the router 3, to and from terminals 1, 9, the external wireless router 6 and the primary connection 4. The condition of the link 4 is monitored by a monitoring system 33. Also provided is a store 35 for data processing applications, which may be retrieved using a retrieval processor 34 for download to terminals connected to the WLAN 2. The router is under the overall control of a processor 32. The router also has a wireless access scanning function 36, allowing it to detect other wireless access points 6. In normal use this can be used to avoid selection of conflicting channels. It also allows the router 3, when operating in "client/repeater" mode, to identify an access point 6 through which it can connect to the Internet.

The applications in the store 35 may be loaded in the router on manufacture or downloaded from a service provider over the Internet 5 and connection 4 in order to upgrade the operation of an existing router.

The process operates as depicted in FIG. 3. The processes in the router 3 are controlled by the processor 32, calling on the application stored in the store 35.

Initially the router 3 is operating normally and running a point to point protocol (PPP) session over a connection 4 with the Internet, mediating a session between a terminal 1 and the Internet 5.

The embodiment causes the router to enable and authenticate client/repeater mode on its wireless interface 2 when the internet connection 4 fails, so it can establish wireless communication 8 to a neighbouring wireless access point 6, so that all traffic through the router 3 can be routed by the switch 37 over the wireless link 8.

The router 3 will therefore operate as a local wireless repeater for the wireless access point 6, allowing access to the data network 5 for any terminals 1, 9 communicating with it. It can also continue to mediate communication between terminals 1, 9 connected directly with the router, so that they continue to benefit from the security of a private LAN. The overall capacity of the link 8 is constrained by the bandwidth available on the wireless interface 2, which has to carry internet traffic over the link to the access point 6 as well as any terminal 1 using the WLAN capability, and is also constrained by the bandwidth made available by the access point 6. In particular, in the event of a general service interruption affecting several access points (e.g. 3), bandwidth on the neighbouring access points (e.g. 6) which are still functioning will need to be shared amongst the access points requiring connection. However, it is likely that the various affected routers 3 would identify different access points as affording the best signal.

The process will now be described with reference to FIG. 3.

As shown in FIG. 3, the router's 3 network monitoring function 33 detects a loss of connection (step 50), or an absence of connectivity when first booted up. After a suitable delay to allow for any transitory faults, the processor 32 stops advertising its presence as a public access terminal (400), in order to prevent any terminals in the area attempting to establish a public-access connection through it.

The router 3 then identifies each terminal 1 with which it is already engaged in a session (step 401), and generates a signal 51 to the user terminal 1 to indicate the loss of connection. Conventionally a message in this situation would simply state that the router is unable to connect to the Internet and to try again later, or consult the service provider's helpdesk. However, in the present invention the user is instead advised that re-establishment of the connection to the Internet is to be attempted. The display may also indicate that the fault has been notified to the service operator, or that the user should report the fault himself. This display is superimposed on whichever display the user is attempting to view. This will offer the use the option of connection to a public wireless access system.

If the user selects this option, the access point 3 operates as a client/router device, and operates the wireless scanning function 36 to identify a wireless access point 6 through which to connect to the internet 5 (step 52). In the event that no access point is available, for example because the user is in a remote location, the "no connection" screen continues to be displayed (520) until connection is re-established (step 57).

If another access point 6 is identified, the router 3 establishes a wireless connection 8 to it. As this will be a public access point (or a public part of a mixed access point) the connection process may be automated using authentication data stored in the router 3.

The router 3 then checks that connection to the Internet 5 has been enabled by attempting connection to ("pinging") one or more reliable websites (step 54) using the WLAN link 8 via the access point 6. This ensures that the access point 6 has a connection 7 to the Internet that is working.

If the "ping" operation fails, the router 3 resets its parameters to their original settings (step 540) and the "no connection" screen continues to be displayed (520) until connection is re-established (step 57).

The test message may also be used to identify what bandwidth is available, so as to indicate to the user whether there are any limitations on bandwidth which might affect his use of the temporary connection route. This may be particularly significant if the user is having to share the use of the access point and associated Internet connection 7 with other users, including the owner of the access point 6.

If the "ping" operation succeeds, indicating that connection has been successful, the router 3 transmits an instruction to the user terminal 1 to display information relating to the alternative connection 6, 7, 8, and any action necessary to report the fault on the primary connection 4 (step 56).

Figure 4:
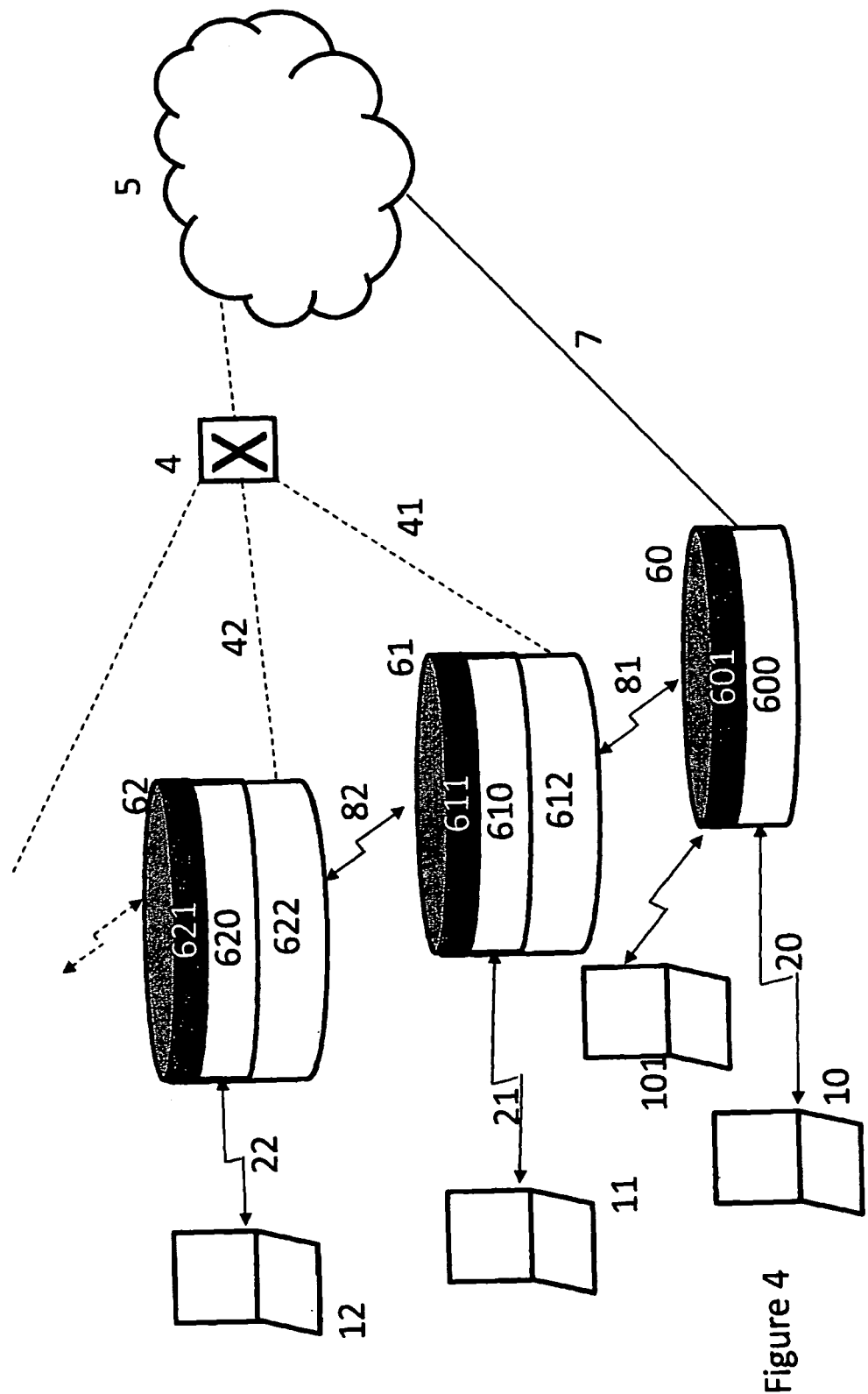
FIG. 4 illustrates an implementation of the invention which may be used by several wireless routers working in series.

If capacity is sufficient, the router may also resume advertising its availability for public access (step 560). This facility may be used to allow several neighbouring access points, all having lost their fixed connection to the data network, to regain connection by providing a relay chain of wireless connections from one to another until an access point that still has a fixed connection is reached. Such an arrangement is shown in FIG. 4.

In this Figure, a number of access points 61, 62 . . . are depicted, each of which is normally connected to the data network 5 by means of a respective fixed-line connection 41, 42, . . . . In the situation to be discussed, all of these access points have experienced a failure of their respective connections, for example because of a fault in a distribution point 4 through which they are all connected.

A further access point 60, whose connection 7 to the data network 5 is still operating, is also depicted. It should be noted that the process to be described only requires the access points 61, 62 . . . which have experienced a failure of their respective network connections 41, 42 . . . to operate according to the invention: the further access point 60 may be conventional.

Each access point 60, 61, 62 . . . typically reserves part of its wireless access capability 600, 610, 620 . . . to a respective home network 20, 21, 22 . . . , through which individual user terminals 10, 11, 12, . . . may be connected, and another part 601, 611, 621 . . . (shown shaded) for public access by other user terminals 101, 111, 121 . . . . The allocations may be fixed—for example 50/50—or they may be allocated dynamically, so that the public has access to any capacity not currently required by the respective home network 20, 21, 22 . . . .

As previously discussed, the access point 61 can operate, according to the invention to set up a wireless link 81 to the public part 601 of another access point 60. In order to do this, it allocates part of its wireless capacity 621 to this link 81. It will be noted that the traffic that can be carried on this link will be limited by the capacity 601 allocated for public access on that access point, which will typically be less than the total capacity of the access point 61.

Having established a link 81 in this way, the access point 61 may advertise the availability of its own public access part 621, allowing a further access point 62 to connect to the data network 7 through the access points 611 and 601.

Further access points can be connected in a chain or "tree" arrangement, although it should be recognised that the capacity available to each access point reduces with the number of steps 81, 82 . . . between that access point and the data network 7, and ultimately by the capabilities of the access point 60 through which all the others are connected to the data network 7. It will be noted that the amount of traffic that each access point (e.g 62) can carry will be limited not only by the capacity 621 allocated for public access on that access point, but by the requirement that some of its capacity 622 is required to carry data over the wireless link 82 with the next access point 61.

As stated above, some access point hardware is not capable of operating in repeater mode (mediating traffic between two WLAN channels on the interface 31) but only in client mode (mediating traffic between the WLAN connection 31 and a wired interface. If this is the case, a user operating a terminal 1 currently connected over a WLAN connection 2 would be advised by the reconnection message to switch to a wired connection to maintain access to the Internet 4. Some public wireless access points impose a maximum connection duration, and a timeout after a specified duration of inactivity. If connection 8 is lost for this reason, the router 3 attempts to reconnect (step 53) using the same authentication details as before. Reconnection may not be successful in every case as there are reasons for loss of service which are outside the control of the router. If reconnection fails, the user is informed (step 520).

The network interface 30 periodically monitors the connection 4 to determine whether direct connection to the Internet has been re-established (step 57, 570). When connection 4 is re-established, the router 3 redirects all traffic over the restored connection instead of the access point 6 (step 58). The router may defer this re-connection until a session currently in progress has been completed, to avoid any interruption in service.

A message is sent (step 59) to any user devices 1 currently in communication with the router 3 over the WLAN 2 to advise them of the re-establishment of the primary connection 4. The router also disables client/repeater mode on the WLAN interface 31 and restore any previous settings to allow auto Channel Selection and broadcast of its own beacon signals.

It is envisaged that the functionality required to control these processes be installed in firmware 32 in the router 3 on manufacture, or downloaded later to an application store 35 over the link 4 from a service provider platform. The necessary authentication details for connection to a public wireless access point 6 can be downloaded to the store 35 as part of this process.

The software to operate the invention may be installed in the access point 6 on manufacture, or supplied to the user on a read-only compact disc (CD-ROM) or other carrier, or over the connection 4, for subsequent installation on an existing access point

What is claimed is:

1. A process for restoration of access between one or more data terminals and a data network by way of a first wireless-enabled access point in communication with the one or more data terminals through a wireless interface after a primary connection between the first wireless-enabled access point and the data network is lost, comprising:
   a) detecting loss of the primary connection to the data network;
   b) conducting a scan for a further wireless-enabled access point;
   c) establishing a wireless connection using the wireless interface between the first wireless-enabled access point and the further wireless-enabled access point;
   d) attempting connection between the first wireless-enabled access point and the data network by way of the further wireless-enabled access point; and
   e) if the first wireless-enabled access point successfully connects to the data network by the first wireless-enabled access point, establishing connection between the one or more data terminals and the data network by way of the first and further wireless-enabled access points;
   wherein the first wireless-enabled access point continues to monitor for availability of the primary connection to identify when connection by way of the primary connection becomes available, and restores its settings to effect such reconnection; and
   wherein such reconnection is deferred until any data session in progress has been completed.

2. A process for restoration of access between one or more data terminals and a data network by way of a first wireless-enabled access point in communication with the one or more data terminals through a wireless interface after a primary connection between the first wireless-enabled access point and the data network is lost, comprising:
   a) detecting loss of the primary connection to the data network;
   b) conducting a scan for a further wireless-enabled access point;
   c) establishing a wireless connection using the wireless interface between the first wireless-enabled access point and the further wireless-enabled access point;
   d) attempting connection between the first wireless-enabled access point and the data network by way of the further wireless-enabled access point; and
   e) if the first wireless-enabled access point successfully connects to the data network by the first wireless-enabled access point, establishing connection between the one or more data terminals and the data network by way of the first and further wireless-enabled access points;
   in which the first wireless-enabled access point transmits a message to the one or more user terminals connected to the first wireless-enabled access point to notify a user that connection is defaulting to a different access route.

3. A process for restoration of access between one or more data terminals and a data network by way of a first wireless-enabled access point in communication with the one or more data terminals through a wireless interface after a primary connection between the first wireless-enabled access point and the data network is lost, comprising:
   a) detecting loss of the primary connection to the data network;
   b) conducting a scan for a further wireless-enabled access point;
   c) establishing a wireless connection using the wireless interface between the first wireless-enabled access point and the further wireless-enabled access point;
   d) attempting connection between the first wireless-enabled access point and the data network by way of the further wireless-enabled access point; and
   e) if the first wireless-enabled access point successfully connects to the data network by the first wireless-enabled access point, establishing connection between the one or more data terminals and the data network by way of the first and further wireless-enabled access points;
   in which the first wireless-enabled access point suspends advertising its presence whilst the primary connection is unavailable; and
   in which once the first wireless-enabled access point has successfully restored connection to the data network by way of a further wireless-enabled access point, the first wireless-enabled access point resumes advertising its presence such that yet further wireless-enabled access points may, in turn, restore connection to the data network by way of the first and further wireless-enabled access points after deferring such reconnection until any data session in progress has been completed.

4. A wireless-enabled access point for connecting one or more user terminals to a data network, the wireless-enabled access point comprising:
- a wireless interface to communicate with the user terminals,
- a second interface arranged to provide a primary connection to the data network,
- a connection monitor to detect loss of the primary connection,
- a scanner to detect the presence of one or more further wireless-enabled access points, and arranged to establish a wireless connection to the data network by way of the wireless interface and one of the further wireless-enabled access points, and
- a switching processor for connecting user terminals to the data network by way of the first and further wireless-enabled access points;
- wherein the connection monitor is arranged to continue to monitor for availability of the primary connection, and the switching processor is arranged to restore connection between the user terminals and the primary connection when connection by way of the primary connection becomes available; and
- wherein the connection monitor is arranged to detect running of a data session by way of the further wireless enabled access point and defer reconnection over the primary connection until the data session in progress has been completed.

5. A wireless-enabled access point for connecting one or more user terminals to a data network, the wireless-enabled access point comprising:
- a wireless interface to communicate with the user terminals,
- a second interface arranged to provide a primary connection to the data network,
- a connection monitor to detect loss of the primary connection,
- a scanner to detect the presence of one or more further wireless-enabled access points, and arranged to establish a wireless connection to the data network by way of the wireless interface and one of the further wireless-enabled access points, and
- a switching processor for connecting user terminals to the data network by way of the first and further wireless-enabled access points;
- wherein the wireless-enabled access point is arranged to transmit a message to one or more user terminals connected to the wireless-enabled access point indicative of the redirection of the connection.

6. A wireless-enabled access point for connecting one or more user terminals to a data network, the wireless-enabled access point comprising:
- a wireless interface to communicate with the user terminals,
- a second interface arranged to provide a primary connection to the data network,
- a connection monitor to detect loss of the primary connection,
- a scanner to detect the presence of one or more further wireless-enabled access points, and arranged to establish a wireless connection to the data network by way of the wireless interface and one of the further wireless-enabled access points, and
- a switching processor for connecting user terminals to the data network by way of the first and further wireless-enabled access points;
- wherein the wireless-enabled access point is arranged to suspend advertising its presence whilst the primary connection is unavailable; and
- wherein the wireless-enabled access point is arranged to resume advertising its presence when the wireless-enabled access point has successfully restored connection to the data network by way of a further wireless-enabled access point, such that yet further wireless-enabled access points may, in turn, restore connection to the data network by way of the first and further wireless-enabled access points after deferring such reconnection until any data session in progress has been completed.

7. A non-transitory computer-readable medium executing/processing data instruction stored in a non-transitory computer readable medium by a CPU or a computer processor, which upon execution of the one or more computer programs, implements the process as claimed in claim 1.

8. A non-transitory computer-readable medium executing/processing data instruction stored in a non-transitory computer readable medium by a CPU or a computer processor, which upon execution of the one or more computer programs, implements the process as in claim 2.

9. A non-transitory computer-readable medium executing/processing data instruction stored in a non-transitory computer readable medium by a CPU or a computer processor, which upon execution of the one or more computer programs, implements the process as in claim 3.

* * * * *